(12) United States Patent
Nam

(10) Patent No.: US 9,690,436 B2
(45) Date of Patent: Jun. 27, 2017

(54) TOUCH PANEL USING SINGLE LAYER PATTERN AND TOUCH SENSING APPARATUS INCLUDING THE TOUCH PANEL

(71) Applicant: Melfas Inc., Seoul (KR)

(72) Inventor: Sung Sik Nam, Seoul (KR)

(73) Assignee: Melfas Inc., Seoul (KR)

( * ) Notice: Subject to any disclaimer, the term of this patent is extended or adjusted under 35 U.S.C. 154(b) by 0 days.

(21) Appl. No.: 14/800,280

(22) Filed: Jul. 15, 2015

(65) Prior Publication Data

US 2016/0018926 A1    Jan. 21, 2016

(30) Foreign Application Priority Data

Jul. 16, 2014    (KR) .................. 10-2014-0089859

(51) Int. Cl.
  *G06F 3/041*    (2006.01)
  *G06F 3/044*    (2006.01)
(52) U.S. Cl.
  CPC .... *G06F 3/044* (2013.01); *G06F 2203/04103* (2013.01)
(58) Field of Classification Search
  None
  See application file for complete search history.

(56) References Cited

U.S. PATENT DOCUMENTS 8,487,898 B2    7/2013    Hotelling
2015/0049258 A1*  2/2015  Qiu .................... G06F 3/0412
                                                    349/12

FOREIGN PATENT DOCUMENTS

KR    1020110007220    1/2011
KR    20140025040    3/2014

OTHER PUBLICATIONS

KIPO, Office Action, Appln. KR 102014-0089859, Jan. 18, 2017, 5 pages.

* cited by examiner

*Primary Examiner* — Joseph Haley
(74) *Attorney, Agent, or Firm* — John V. Daniluck; Bingham Greenebaum Doll LLP

(57) ABSTRACT

The touch panel includes a touch detecting region in which a plurality of sensing regions are two-dimensionally arranged on a single substrate, a plurality of first electrodes formed in shapes of predetermined patterns in the plurality of sensing regions, respectively, and sensing a position of a vertical axis of touch applied to the touch detecting region, and a plurality of second electrodes electrically insulated from the first electrodes in the plurality of sensing regions, respectively.

11 Claims, 10 Drawing Sheets

610

710

810

TOUCH PANEL USING SINGLE LAYER PATTERN AND TOUCH SENSING APPARATUS INCLUDING THE TOUCH PANEL

CROSS-REFERENCE TO RELATED APPLICATION

This U.S. non-provisional patent application claims priority under 35 U.S.C. §119 to Korean Patent Application No. 10-2014-0089859, filed on Jul. 16, 2014, in the Korean Intellectual Property Office, the disclosure of which is hereby incorporated by reference in its entirety.

BACKGROUND

Embodiments of the inventive concepts relate to a touch panel using a single layer pattern for sensing touch and a touch sensing apparatus including the touch panel.

A touch sensing apparatus corresponds to one of input units constituting an interface between a user and an information communication device using at least one of various display devices. A user may touch an input tool (e.g., a hand or a pen) to a screen of the touch sensing apparatus to easily input information to the information communication device.

Touch sensing apparatuses may be classified into resistive type touch sensing apparatuses, capacitive type touch sensing apparatuses, surface acoustic wave (SAW) type touch sensing apparatuses, and infrared type touch sensing apparatuses according to operating methods. Of these, the capacitive type touch sensing apparatuses have been applied to various devices (e.g., mobile devices) because of their thin thicknesses, excellent endurance, and multi-touch characteristics.

Some of the capacitive type touch sensing apparatuses may confirm touch input information using self-capacitance generating between a touch object and an electrode without an additional driving signal, and others of the capacitive type touch sensing apparatuses may confirm touch input information using mutual-capacitance generated between a driving electrode and a sensing electrode by contact of the touch object.

The capacitive type touch sensing apparatuses using the self-capacitance may have a simple circuit and may be easily realized. However, the capacitive type touch sensing apparatuses using the self-capacitance may not easily confirm multi-touch. On the other hand, the capacitive type touch sensing apparatuses using the mutual-capacitance may easily confirm the multi-touch but should have a double-layered electrode for sensing a touch position.

A technique for integrating the double-layered electrode of the touch sensing apparatus using the mutual-capacitance in one layer has been developed as thicknesses of touch sensing apparatuses have been reduced. Thus, a structure of the electrode pattern of the touch sensing apparatus may become more complex, and an outer interconnection region of the touch sensing apparatus may need a more complex interconnection structure in order to be connected to the electrode pattern. As a result, processes of forming the outer interconnection region may be complicated and a defect rate of the touch sensing apparatus may be increased.

SUMMARY

Embodiments of the inventive concepts may provide a touch panel capable of reducing the number of inner interconnections formed on a single substrate and a touch sensing apparatus including the same.

Embodiments of the inventive concepts may also provide a touch panel capable of reducing interference between an inner interconnection of a first electrode and a second electrode line and a touch sensing apparatus.

In one aspect, a touch panel may include: a touch detecting region in which a plurality of sensing regions are two-dimensionally arranged on a single substrate; a plurality of first electrodes formed in shapes of predetermined patterns in the plurality of sensing regions, respectively, the plurality of first electrodes sensing a position of a vertical axis of touch applied to the touch detecting region; and a plurality of second electrodes electrically insulated from the first electrodes in the plurality of sensing regions, respectively, the plurality of second electrodes surrounding the first electrodes along the predetermined patterns, the plurality of second electrodes extending in a direction of the vertical axis, and the plurality of second electrodes sensing a position of a horizontal axis of the touch. Patterns of the first electrodes adjacent to each other along the vertical axis may form a blur section in which the patterns share a position of at least a portion of the vertical axis while being spaced apart from each other along the horizontal axis.

In an embodiment, the predetermined pattern may include a plurality of assistant electrodes. The plurality of assistant electrodes may be spaced apart from each other along the horizontal axis and may be disposed at different positions on the vertical axis. The plurality of assistant electrodes may be electrically connected to each other.

In an embodiment, the blur section may be formed by a first assistant electrode of the plurality of assistant electrodes included in one first electrode and a second assistant electrode of the plurality of assistant electrodes included in another first electrode adjacent to the one first electrode along the vertical axis. The first assistant electrode and the second assistant electrode may share the position of the at least a portion of the vertical axis while being spaced apart from each other along the horizontal axis.

In an embodiment, the predetermined pattern may include two bars that are spaced apart from each other along the horizontal axis and have predetermined lengths. The two bars may be disposed at different positions on the vertical axis and may be electrically connected to each other.

In an embodiment, the blur section may be formed by a first bar of the two bars included in one first electrode and a second bar of the two bars included in another first electrode adjacent to the one first electrode along the vertical axis. The first bar and the second bar may share the position of the at least a portion of the vertical axis while being spaced apart from each other along the horizontal axis.

In an embodiment, the touch panel may further include: an outer interconnection region provided at a side of the touch detecting region; and a plurality of inner interconnections electrically connected to the plurality of first electrodes, respectively, the plurality of inner interconnections extending along the vertical axis to the outer interconnection region. The inner interconnections may be disposed in such a way that a distance between the inner interconnections increases as the number of the inner interconnections disposed between the first electrodes adjacent to each other along the horizontal axis decreases.

In an embodiment, a distance between the inner interconnections disposed between the first electrodes adjacent to each other along the horizontal axis may be determined to divide a space between the first electrodes adjacent to each other along the horizontal axis into equal parts.

In another aspect, a touch panel may include: a touch detecting region in which a plurality of sensing regions are two-dimensionally arranged on a single substrate; a plurality of first electrodes formed in shapes of predetermined patterns in the plurality of sensing regions, respectively, the plurality of first electrodes sensing a position of a vertical axis of touch applied to the touch detecting region; and a plurality of second electrodes electrically insulated from the first electrodes in the plurality of sensing regions, respectively, the plurality of second electrodes surrounding the first electrodes along the predetermined patterns, the plurality of second electrodes extending in a direction of the vertical axis, and the plurality of second electrodes sensing a position of a horizontal axis of the touch. Arrangement directions of the predetermined patterns of the first electrodes adjacent to each other along the vertical axis may be different from each other in such a way that connection directions of the adjacent first electrodes with respect to inner interconnections are opposite to each other.

In still another aspect, a touch sensing apparatus may include the touch panel.

BRIEF DESCRIPTION OF THE DRAWINGS

The inventive concepts will become more apparent in view of the attached drawings and accompanying detailed description.

DETAILED DESCRIPTION OF THE EMBODIMENTS

Figure 1:
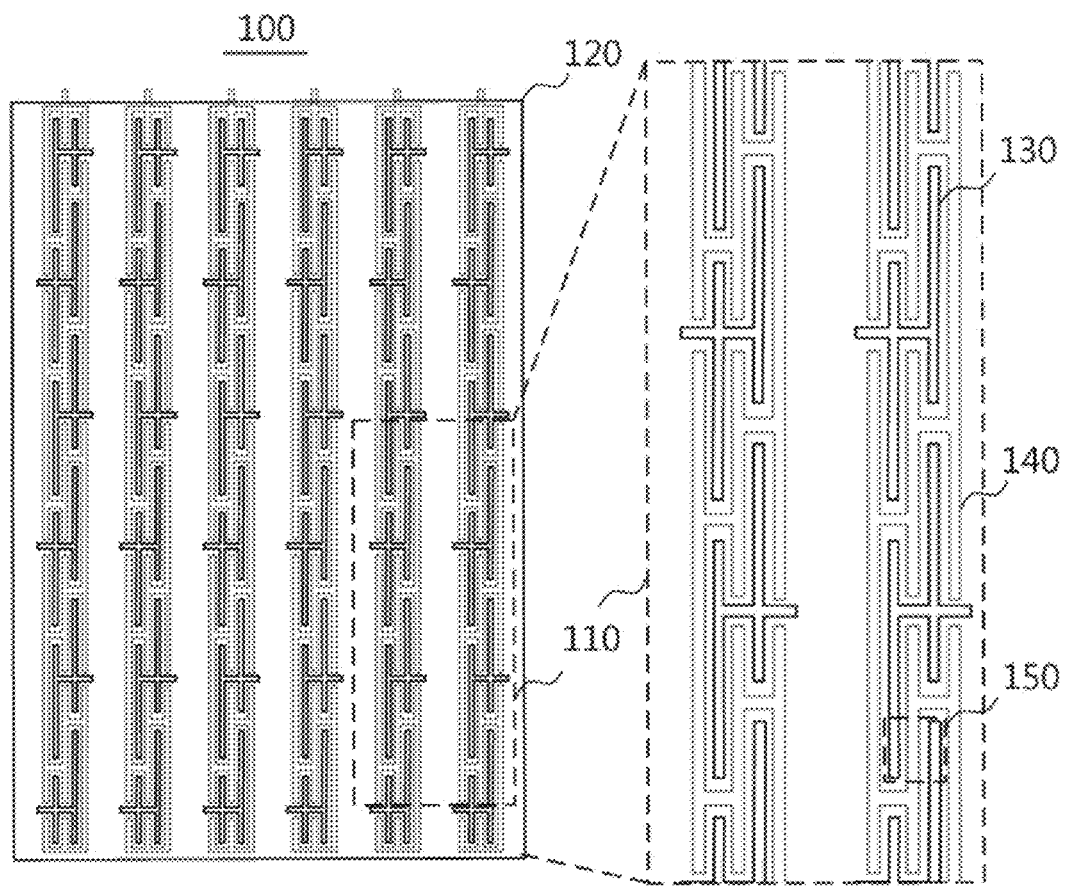
FIG. 1 is a view illustrating an embodiment of a touch panel for sensing a touch position on the touch panel according to example embodiments of the inventive concepts.

The inventive concepts will now be described more fully hereinafter with reference to the accompanying drawings, in which exemplary embodiments of the inventive concepts are shown. The advantages and features of the inventive concepts and methods of achieving them will be apparent from the following exemplary embodiments that will be described in more detail with reference to the accompanying drawings. It should be noted, however, that the inventive concepts are not limited to the following exemplary embodiments, and may be implemented in various forms. Accordingly, the exemplary embodiments are provided only to disclose the inventive concepts and let those skilled in the art know the category of the inventive concepts. In the drawings, embodiments of the inventive concepts are not limited to the specific examples provided herein and are exaggerated for clarity.

The terminology used herein is for the purpose of describing particular embodiments only and is not intended to limit the invention. As used herein, the singular terms "a," "an" and "the" are intended to include the plural forms as well, unless the context clearly indicates otherwise. As used herein, the term "and/or" includes any and all combinations of one or more of the associated listed items. It will be understood that when an element is referred to as being "connected" or "coupled" to another element, it may be directly connected or coupled to the other element or intervening elements may be present.

Similarly, it will be understood that when an element such as a layer, region or substrate is referred to as being "on" another element, it can be directly on the other element or intervening elements may be present. In contrast, the term "directly" means that there are no intervening elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Additionally, the embodiment in the detailed description will be described with sectional views as ideal exemplary views of the inventive concepts. Accordingly, shapes of the exemplary views may be modified according to manufacturing techniques and/or allowable errors. Therefore, the embodiments of the inventive concepts are not limited to the specific shape illustrated in the exemplary views, but may include other shapes that may be created according to manufacturing processes. Areas exemplified in the drawings have general properties, and are used to illustrate specific shapes of elements. Thus, this should not be construed as limited to the scope of the inventive concepts.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concepts explained and illustrated herein include their complementary counterparts. The same reference numerals or the same reference designators denote the same elements throughout the specification.

Moreover, exemplary embodiments are described herein with reference to cross-sectional illustrations and/or plane illustrations that are idealized exemplary illustrations. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of example embodiments.

Capacitive type touch screens may be classified according to a type using self-capacitance and a type using mutual-capacitance. According to the type using the self-capacitance, an additional driving signal may not be applied to recognize a touch input but a capacitance between a sensing electrode of a touch panel and a contact object (e.g., a finger) may be sensed to determine a touch input position. If a portion of the human body touches a touch sensor, a capacitance may be generated between the sensing electrode and the touch portion of the human body. A sensing circuit electrically connected to the touch sensor may supply charges to the touch sensor and then may measure a voltage or current variation according to the supply of the charges to sense whether or not the touch occurs, and a touch area.

According to the type using the mutual-capacitance, the touch input may be sensed through a touch panel, including a driving electrode sequentially supplied with a driving signal and a sensing electrode sensing the touch input in response to a driving signal applying time, by a driving-sensing principle. In this touch panel, the mutual-capacitance may be generated between the driving electrode and the sensing electrode by the driving signal and a variation in the mutual-capacitance may occur when a touch object (e.g., a finger) touches the touch panel. The touch panel may sense the variation in the mutual-capacitance to determine a touch input position.

According to some embodiments, to improve accuracy of touch sensing, the type using the mutual-capacitance may increase the number of crossing spots (e.g., nodes) of electrodes to improve resolution of touch input determination or may increase the variation in the mutual-capacitance generated between two electrodes.

Hereinafter, embodiments of the inventive concepts will be described with reference to the drawings.

FIG. 1 is a view illustrating an embodiment of a touch panel for sensing a touch position on the touch panel according to example embodiments of the inventive concepts. FIG. 1 shows an embodiment of a touch panel 100, and a dotted box 110 of FIG. 1 is an enlarged view of a portion of the touch panel 100.

The touch panel 100 according to the present embodiment may include a touch detecting region 120, a plurality of transmitting (Tx) electrodes represented by a black line, and a plurality of receiving (Rx) electrodes represented by a gray line.

Hereinafter, embodiments including the receiving electrode surrounding the transmitting electrode will be described. However, the inventive concepts are not limited thereto. In other embodiments, the transmitting electrode may surround the receiving electrode. In other words, according to some embodiments of the inventive concepts, a second electrode may surround a second electrode, and the first electrode and the second electrode may correspond to the transmitting electrode and the receiving electrode, respectively. According to other embodiments, the first electrode may correspond to the receiving electrode, and the second electrode may correspond to the transmitting electrode.

In the touch detecting region 120, a plurality of sensing regions may be two-dimensionally arranged on a single substrate.

The plurality of transmitting electrodes may be formed in shapes of predetermined patterns in the plurality of sensing regions, respectively. The plurality of transmitting electrodes may sense a position according to a first axis of touch applied to the touch detecting region 120. In FIG. 1, the first axis may mean a vertical axis, and a transmitting electrode 130 corresponds to one of the plurality of transmitting electrodes.

The plurality of receiving electrodes may be electrically isolated from the transmitting electrodes in the plurality of sensing regions, respectively. In addition, the plurality of receiving electrodes may surround the plurality of transmitting electrodes along a predetermined pattern and may extend in a first axis direction to sense a position according to a second axis (e.g., a horizontal axis). In the embodiment of FIG. 1, a receiving electrode 140 may surround the transmitting electrodes (including the transmitting electrode 130) arranged in the first axis to constitute a column and may extend in the first axis direction.

At this time, the patterns of the transmitting electrodes adjacent to each other along the first axis may form a blur section 150 in which the patterns share a position of at least a portion of the first axis while being spaced apart from each other along the second axis.

The predetermined pattern forming the transmitting electrode 130 may include two bars that have predetermined lengths and are spaced apart from each other along the second axis. Positions on the first axis of the two bars may be different from each other, and the two bars may be electrically connected to each other.

At this time, in the blur section 150, one bar of the transmitting electrode 130 and one bar of another transmitting electrode adjacent to the transmitting electrode 130 in the first axis may share a position of a portion of the first axis and may be spaced apart from each other along the second axis. In the embodiment of FIG. 1, the bars included in the transmitting electrodes adjacent to each other along the first axis form the blur section 150. However, the inventive concepts are not limited thereto. In other embodiments, shapes of the patterns included in the blur section 150 may be variously modified.

Figure 2:
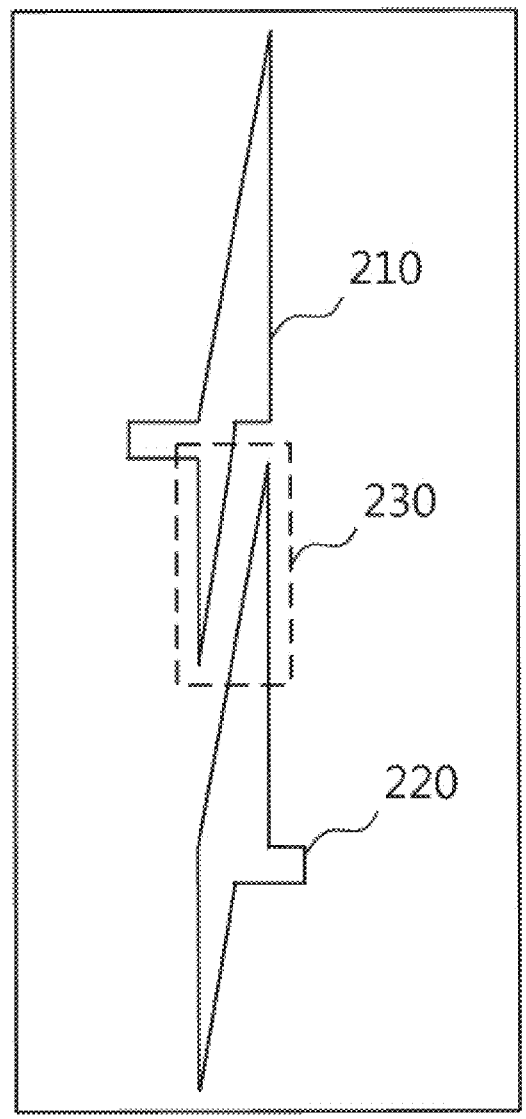
FIG. 2 is a view illustrating an embodiment of transmitting electrodes forming a blur section according to example embodiments of the inventive concepts.

FIG. 2 is a view illustrating an embodiment of transmitting electrodes forming a blur section according to example embodiments of the inventive concepts. FIG. 2 illustrates a first transmitting electrode 210 and a second transmitting electrode 220 that form a blur section 230 in which the first and second transmitting electrodes 210 and 220 share a position of at least a portion of the first axis while being spaced apart from each other along the second axis. As shown in FIG. 2, the patterns of the first electrodes according to the present embodiment are not limited to bar shapes. The patterns may include triangular structures, as shown in FIG. 2. Alternatively, the patterns may include at least one of other various shapes such as a polygonal shape, a streamline shape, and a circular shape. In addition, the number of assistant electrodes corresponding to the bar structures or triangular structures included in the patterns may be two or more.

For example, the pattern of the first electrode (corresponding to the transmitting electrode or the receiving electrode as described above) of the embodiments of the inventive concepts may include a plurality of assistant electrodes. The plurality of assistant electrodes may be spaced apart from each other along the second axis (the horizontal axis) and may be disposed at different positions in the first axis (the vertical axis). In addition, the plurality of assistant electrodes may be electrically connected to each other.

At this time, the blur section may be formed by a first assistant electrode of the plurality of assistant electrodes included in one first electrode and a second assistant electrode of the plurality of assistant electrodes included in another first electrode adjacent to the one first electrode in the first axis (the vertical axis). In this case, the first assistant electrode and the second assistant electrode may share a position of at least a portion of the first axis (the vertical axis) and be spaced apart from each other along the second axis (the horizontal axis) in the blur section.

Figure 3:
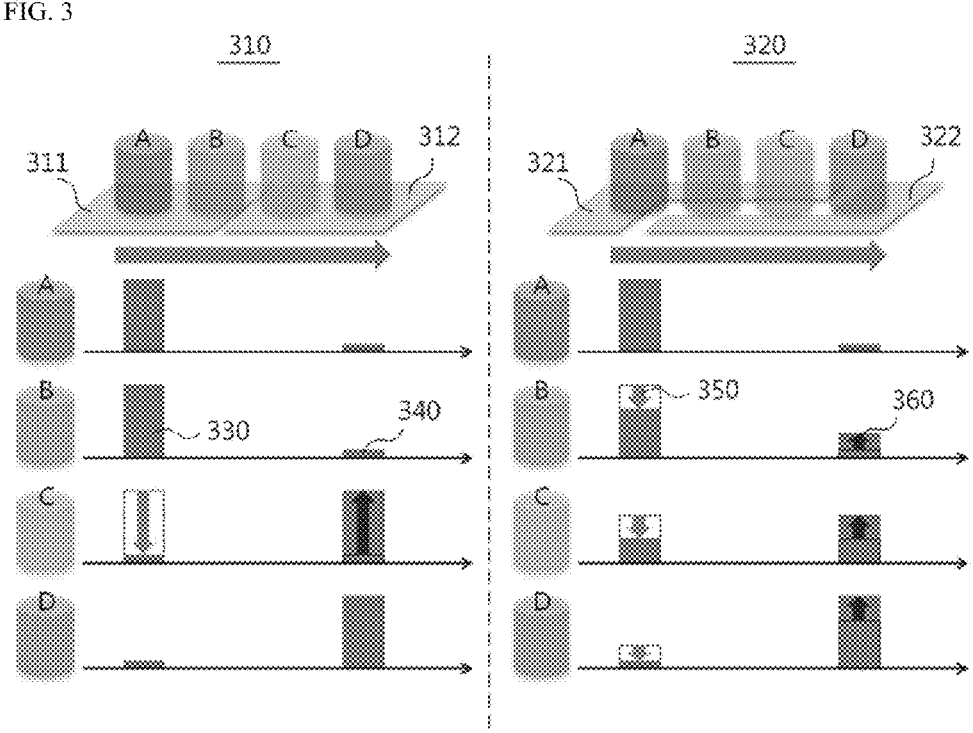
FIG. 3 is a view illustrating an embodiment of sensitivity variation in the transmitting electrodes including the blur section and an embodiment of sensitivity variation in transmitting electrodes not including the blur section.

FIG. 3 is a view illustrating an embodiment of sensitivity variation in the transmitting electrodes including the blur section and an embodiment of sensitivity variation in transmitting electrodes not including the blur section.

In FIG. 3, a normal pattern 310 illustrates two transmitting electrodes 311 and 312 which are adjacent to each other along the first axis and do not form the blur section. In the normal pattern 310, when a touch object moves from a position A to a position D, a sensitivity variation occurs once at a position C at which the touch object moves from the transmitting electrode 311 to the transmitting electrode 312. In a graph of the FIG. 3, a first bar 330 shows sensitivity of the transmitting electrode 311 when the object is disposed at a position B, and a second bar 340 shows sensitivity of the transmitting electrode 312 when the object is disposed at the position B. In FIG. 3, an arrow shows the sensitivity variation.

On the other hand, in FIG. 3, a pattern 320 forming the blur section includes two transmitting electrodes 321 and 322 that are adjacent to each other along the first axis and form the blur section. When an object moves from a position A to a position D in the blur section, the sensitivity is varied at all positions A, B, C, and D.

For example, the object touching the position B affects both the transmitting electrode 321 and the transmitting electrode 322. At this time, a first arrow 350 means that the sensitivity is reduced at the transmitting electrode 321, a second arrow 360 means that the sensitivity increases at the transmitting electrode 322.

Figure 4:
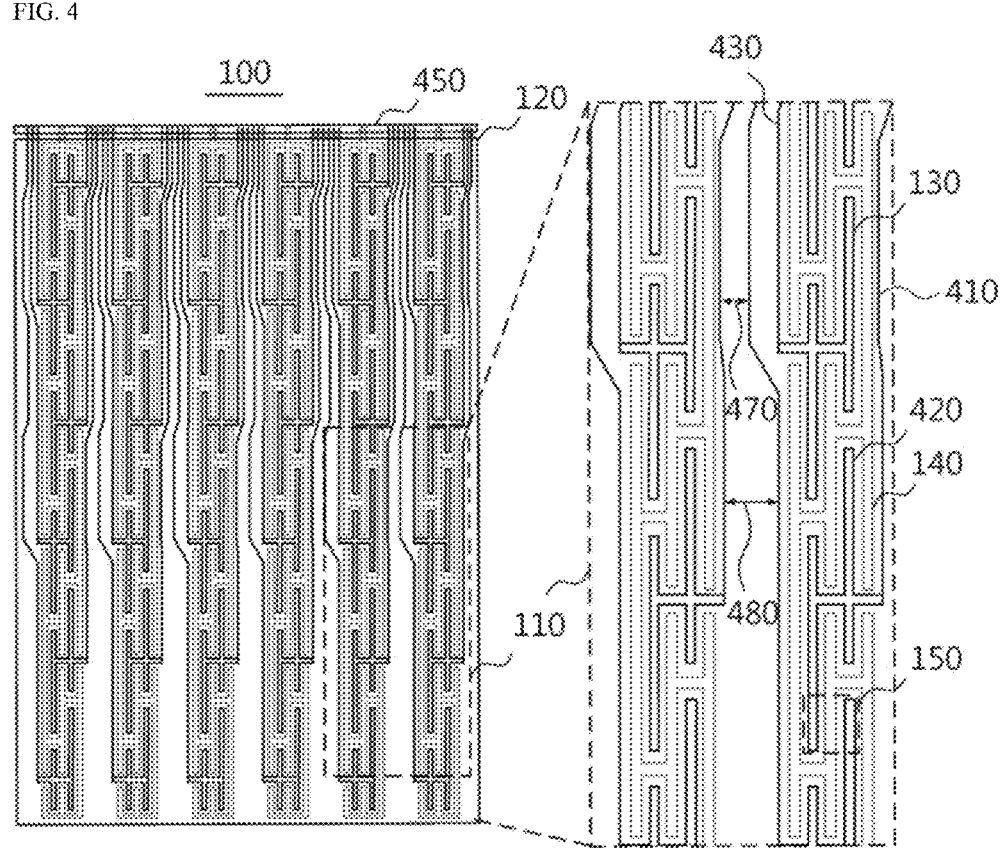
FIG. 4 is a view illustrating an embodiment of a touch panel including inner interconnections according to example embodiments of the inventive concepts.

As described above, since the transmitting electrodes are formed in the touch panel 100 in such a way that the blur section is formed between the transmitting electrodes adjacent to each other along the first axis, the sensitivity can be continuously varied when the object such as a conductive rod moves. As a result, the touch panel 100 can recognize delicate touch. For example, since the delicate touch can be recognized, the number of the transmitting electrodes per unit area can be reduced. The reduction in the number of the transmitting electrodes may mean reduction in the number of inner interconnections to be described later. since the number of the inner interconnections is reduced, the unit area of touch detecting region may sense more delicate touch or more delicate movement of the conductive rod FIG. 4 is a view illustrating an embodiment of a touch panel including inner interconnections according to example embodiments of the inventive concepts. FIG. 4 illustrates inner interconnections electrically connected to the transmitting electrodes of the touch panel 100 described with reference to FIG. 1.

As illustrated in FIG. 4, arrangement directions of the patterns forming the transmitting electrodes adjacent to each other along the first axis may be different from each other such that connection directions of the transmitting electrodes with respect to the inner interconnections are opposite to each other. For example, the transmitting electrode 130 may be connected to an inner interconnection 430 disposed at a left side thereof, and a transmitting electrode 420 may be connected to an inner interconnection 410 disposed at a right side thereof.

A section in which the inner interconnections and the receiving electrodes are disposed in parallel to each other can be reduced by the arrangement of the inner interconnections reflective of the different arrangements of the transmitting electrodes adjacent to each other along the first axis, thereby reducing interference between the inner interconnections of the transmitting electrodes and the receiving electrodes having line shapes.

In addition, the touch panel 100 may further include an outer interconnection region 450 that is disposed at a side of the touch detecting region. The inner interconnections connected to the plurality of transmitting electrodes may extend along the first axis to the outer interconnection region 450. At this time, the inner interconnections may be disposed in such a way that a distance between the inner interconnections increases as the number of the inner interconnections disposed between the transmitting electrodes adjacent to each other along the second axis decreases.

For example, as shown in FIG. 4, a distance 480 between the inner interconnections when the number of the inner interconnections between the adjacent transmitting electrodes along the second axis is 2 may be greater than a distance 470 between the inner interconnections when the number of the inner interconnections between the adjacent transmitting electrodes along the second axis is 3.

As described above, since the distance between the inner interconnections is changed according to the number of the inner interconnections in the space in which the inner interconnections are disposed, a coupling cap between the inner interconnections may be reduced to reduce crosstalk.

In the embodiment of FIG. 4, only the distance between the inner interconnections is considered but a distance between the inner interconnection and the receiving electrode is not considered. In other embodiments, the distance between the inner interconnection and the receiving electrode may also be considered. For example, the distances between the inner interconnections disposed between the transmitting electrodes adjacent to each other along the second axis may be determined such that the space between the transmitting electrodes adjacent to each other along the second axis is divided into equal parts.

Figure 5:
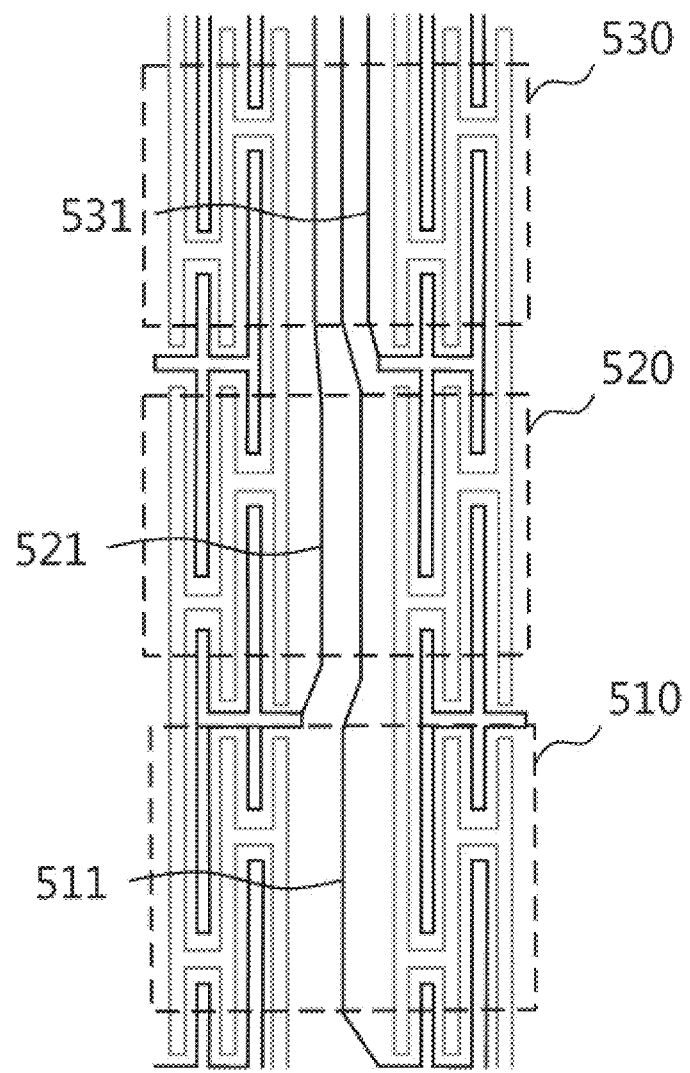
FIG. 5 is a view illustrating inner interconnections dividing a space between transmitting electrodes adjacent to each other along a second axis into equal parts.

FIG. 5 is a view illustrating inner interconnections dividing a space between transmitting electrodes adjacent to each other along a second axis into equal parts. FIG. 5 illustrates a portion of the inner interconnections for the purpose of ease and convenience in explanation.

A first dotted box 510 shows the space between the transmitting electrodes adjacent to each other along the second axis which is divided into two equal parts by the inner interconnection 511 disposed between the transmitting electrodes adjacent to each other along the second axis.

A second dotted box 520 shows the space between the transmitting electrodes adjacent to each other along the second axis which is divided into three equal parts by the inner interconnections 511 and 521 disposed between the transmitting electrodes adjacent to each other along the second axis.

A third dotted box 530 shows the space between the transmitting electrodes adjacent to each other along the second axis which is divided into four equal parts by the inner interconnections 511, 521, and 531 disposed between the transmitting electrodes adjacent to each other along the second axis.

As described above, in the space in which the inner interconnections are disposed, the distances between the inner interconnections are changed according to the number of the inner interconnections, and both the distance between inner interconnections and the distance between the inner interconnection and the receiving electrode are considered. Thus, it is possible to minimize crosstalk between the inner interconnections and crosstalk between the inner interconnection and the receiving electrode.

Figure 6:
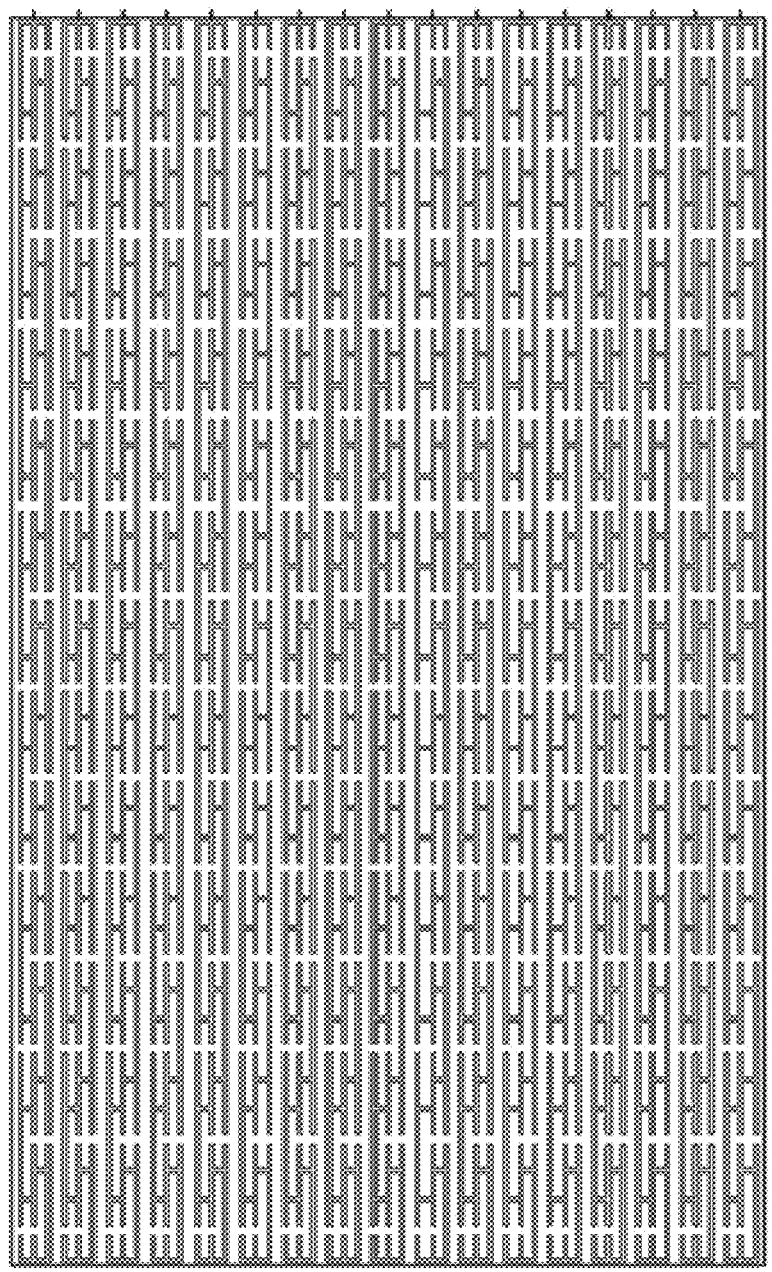
FIG. 6 is a view illustrating an embodiment of a plurality of receiving electrodes according to example embodiments of the inventive concepts.
Figure 7:
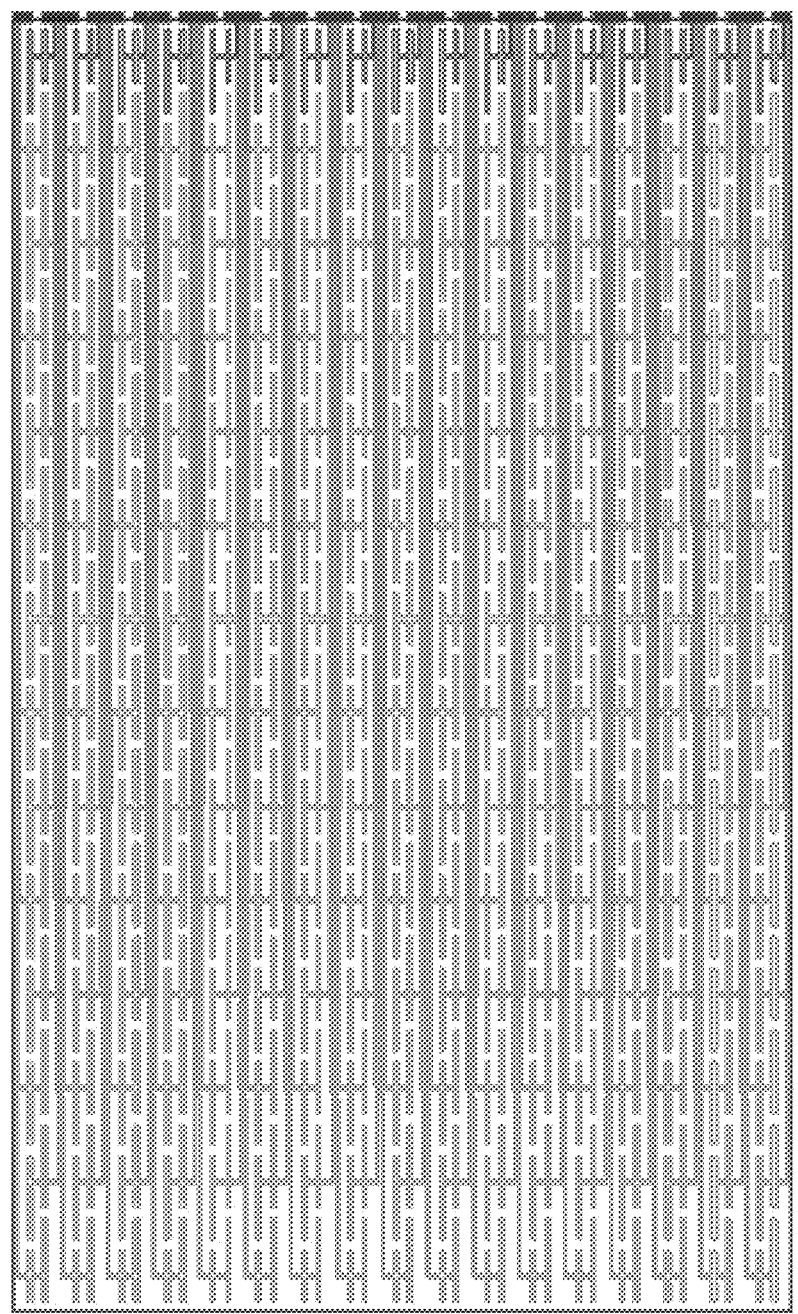
FIG. 7 is a view illustrating an embodiment of a plurality of transmitting electrodes and inner interconnections respectively connected to the plurality of transmitting electrodes according to example embodiments of the inventive concepts.
Figure 8:
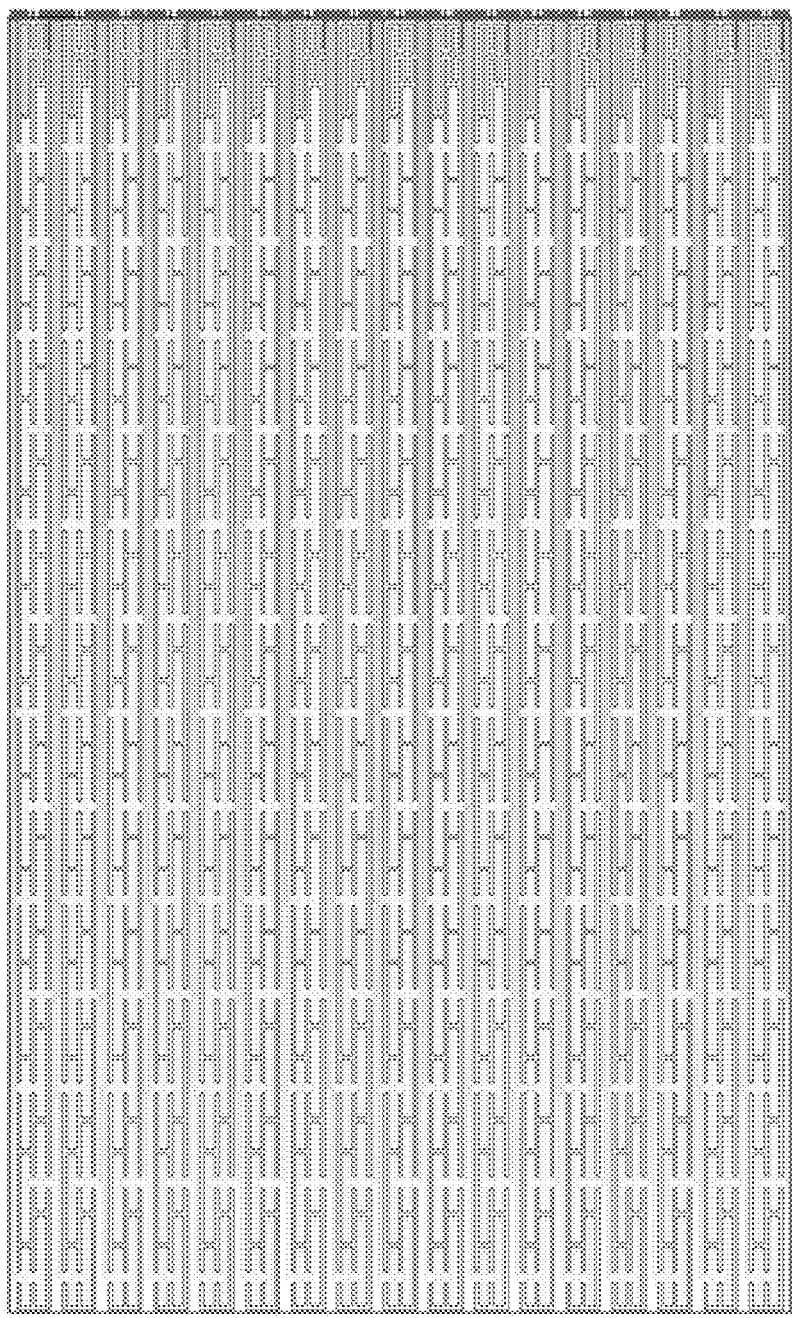
FIG. 8 is a view illustrating an embodiment of a plurality of receiving electrodes, a plurality of transmitting electrodes, and inner interconnections respectively connected to the plurality of transmitting electrodes.

FIG. 6 is a view illustrating an embodiment of a plurality of receiving electrodes according to example embodiments of the inventive concepts. FIG. 7 is a view illustrating an embodiment of a plurality of transmitting electrodes and inner interconnections respectively connected to the plurality of transmitting electrodes according to example embodiments of the inventive concepts. FIG. 8 is a view illustrating an embodiment of a plurality of receiving electrodes, a plurality of transmitting electrodes, and inner interconnections respectively connected to the plurality of transmitting electrodes.

FIGS. 1 and 4 illustrate the transmitting electrodes arranged in a 6-by-6 matrix (36 transmitting electrodes), and the plurality of receiving electrodes and the inner interconnections corresponding to the transmitting electrodes. Alternatively, as illustrated in FIGS. 6 to 8, the number or sizes of the receiving electrodes may be controlled to realize touch detecting regions of various sizes.

As described above, the number of the transmitting electrodes is reduced by the blur section, and thus, the number of the inner interconnections. As illustrated in FIGS. 7 and 8, the number of the inner interconnections may be reduced by reducing the number of the transmitting electrodes arranged in the first axis. This may mean that a size of a path of the inner interconnections is reduced. In addition, this may mean that more columns of the transmitting electrodes are included in the same area. Thus, it is possible to improve a touch recognizing ability of the touch panel according to example embodiments of the inventive concepts.

Figure 9:
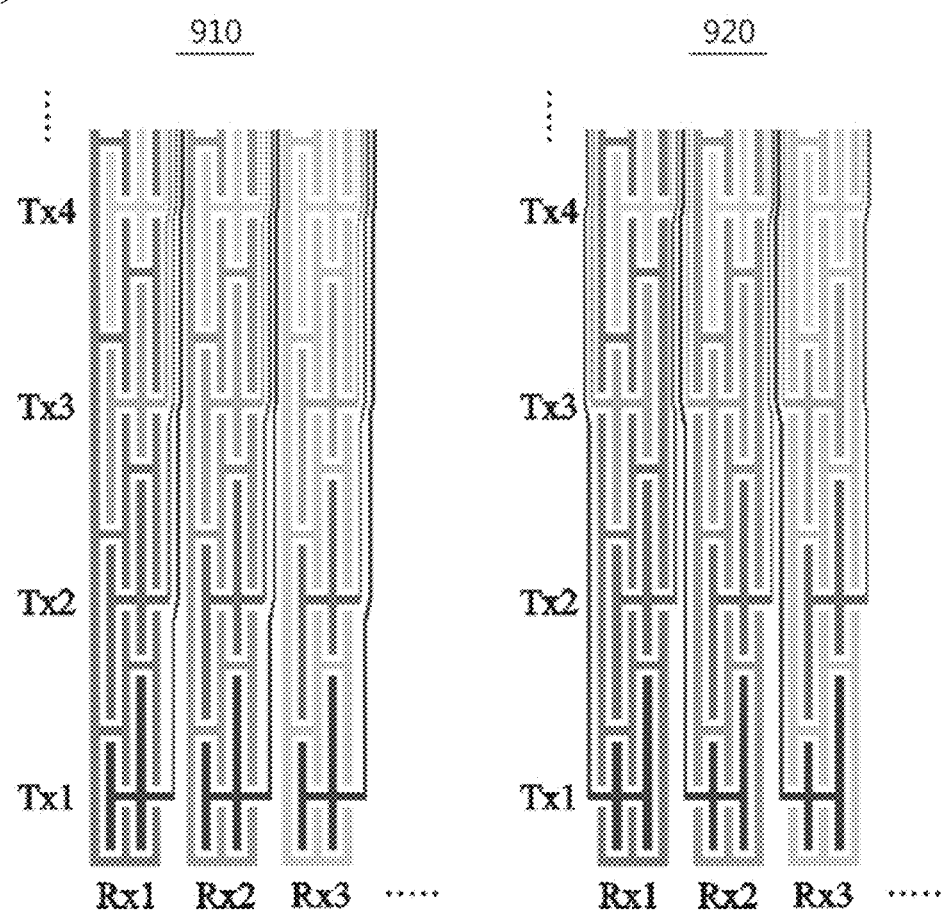
FIG. 9 is a view illustrating an embodiment of arrangement of patterns realizing transmitting electrodes included in a touch panel according to example embodiments of the inventive concepts.

FIG. 9 is a view illustrating an embodiment of arrangement of patterns realizing transmitting electrodes included in a touch panel according to example embodiments of the inventive concepts.

A pattern 920 shows the transmitting electrodes adjacent to each other along the first axis which are connected to the inner interconnections in the directions opposite to each other, as shown in FIGS. 1, 4, and 6 to 8.

Alternatively, like a pattern 910, the transmitting electrodes adjacent to each other along the first axis may be connected to the inner connection in the same direction. In this case, the transmitting electrodes adjacent to each other along the first axis may also form the blur section. In addition, the distance between the inner interconnections may increase as the number of the inner interconnections decreases, like the pattern 910. Furthermore, the distance between the inner interconnections may be adjusted to divide the space between the transmitting electrodes adjacent to each other along the second axis into equal parts.

As described above, according to example embodiments of the inventive concepts, a single layer pattern for sensing touch may include a plurality of the first electrodes and a plurality of the second electrodes. The patterns forming the first electrodes adjacent to each other along the vertical axis may be disposed to form the blur section in which the patterns share the position of at least a portion of the vertical axis while being spaced apart from each other along the horizontal axis and. As a result, the number of the first electrodes can be reduced. Since the number of the first electrodes is reduced, the number of the inner interconnections formed on the single substrate may be reduced.

In addition, the arrangement directions of the predetermined patterns of the first electrodes adjacent to each other along the vertical axis are formed to be different from each other such that the connection directions of the inner interconnections with respect to the transmitting electrodes are opposite to each other. Thus, the section in which the inner interconnection of the first electrode and the second electrode of a line shape are disposed in parallel to each other can be reduced to reduce the interference between the inner interconnection and the second electrode.

The touch panel according to the above mentioned embodiments of the inventive concepts may be included in a touch sensing apparatus.

Figure 10:
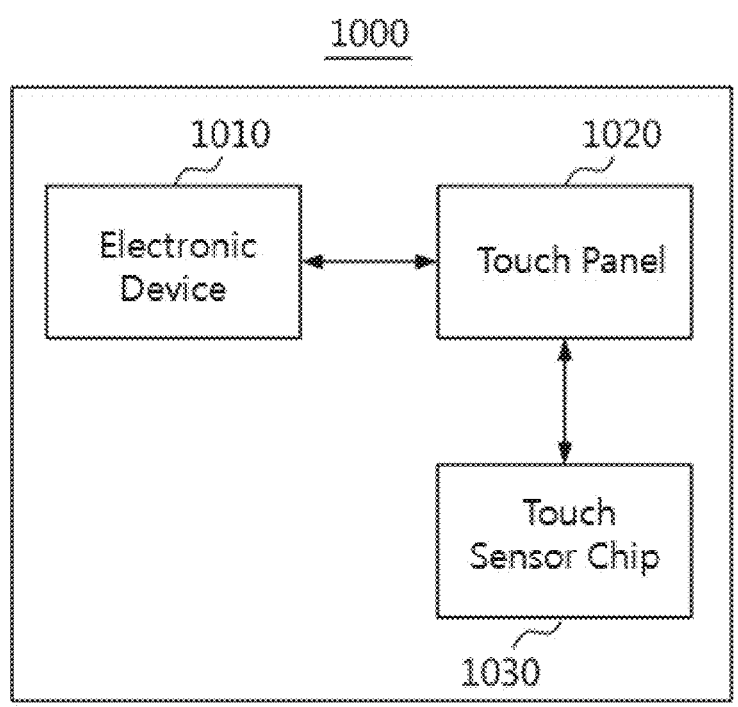
FIG. 10 is a schematic block diagram illustrating a touch sensing apparatus according to example embodiments of the inventive concepts.

FIG. 10 is a schematic block diagram illustrating a touch sensing apparatus according to example embodiments of the inventive concepts. A touch sensing apparatus 1000 may include an electronic device 1010, a touch panel 1020, and a touch sensor chip 1030.

The electronic device 1010 may be disposed around the touch panel 1020. The electronic device 1010 may be a device that is driven by a clock signal or a driving signal to generate an electromagnetic wave. For example, the touch panel 1020 may be generally disposed on a display panel displaying an image, so the electronic device 101 may be the display panel, a voltage supply unit supplying a voltage to the touch panel 1020, or an electronic device which is disposed outside of the touch sensing apparatus 1000 including the touch panel 1020 to generate an electromagnetic wave.

The electronic device 1010 may be the display panel. The display panel may be a panel displaying the image. For example, the display panel may be a liquid crystal display panel, an electrophoretic display panel, an organic light-emitting diode (OLED) panel, a LED panel, an inorganic electroluminescent (EL) display panel, a field emission display (FED) Panel, a surface-conduction electron-emitter display (SED) Panel, a plasma display panel (PDP), or a cathode ray tube (CRT) display panel. The touch panel 1020 may be stacked on one surface of the display panel. In the present specification, the electronic device 1010 of the display panel is described as an example for the purpose of convenience in explanation. However, the inventive concepts are not limited thereto. In other embodiments, the electronic device 1010 may include at least one of other electronic devices generating the electromagnetic wave outside of the touch panel 1020 to affect operations of the touch panel 1020.

The display panel may be the liquid crystal display panel which is driven using a clock signal. In the present specification, the electronic device 1010 of the liquid crystal display panel is described as an example for the purpose of convenience in explanation. However, the inventive concepts are not limited thereto. In other embodiments, the electronic device 1010 may include at least one of various kinds of display panels driven by the clock signal or a driving signal.

The touch panel 1020 may be one of the touch panels described with reference to FIGS. 1 to 9 and may be disposed to be adjacent to the electronic device 1010. The touch panel 1020 may receive a touch signal of a user. The touch panel 1020 may be disposed on the display panel displaying an image to receive a touch signal of a user.

The touch sensor chip 1030 may apply a driving signal to the touch panel 1020 and/or may receive a sensing signal from the touch panel 1020. For example, the touch sensor chip 1030 may determine a touch position by means of signals inputted through the transmitting electrodes and the receiving electrodes.

According to some embodiments of the inventive concepts, the single layer pattern for sensing touch may include the plurality of first electrodes (e.g., the plurality of transmitting (Tx) electrodes) and the plurality of second electrodes (e.g., the plurality of receiving (Rx) electrodes). At this time, the patterns forming the first electrodes adjacent each other along the first axis (e.g., the vertical axis) are disposed to form the blur section in which the patterns share the position of at least a portion of the first axis while being spaced apart from each other along the second axis (e.g., the horizontal axis), and thus, the number of the first electrodes can be reduced. Since the number of the first electrodes is reduced, the number of the inner interconnections formed on the single substrate can be reduced.

According to other embodiments of the inventive concepts, the single layer pattern for sensing touch may include the plurality of first electrodes (e.g., the plurality of transmitting (Tx) electrodes) and the plurality of second electrodes (e.g., the plurality of receiving (Rx) electrodes). At this time, the arrangement directions of the predetermined patterns forming the first electrodes are different from each other in such a way that the first electrodes adjacent to each other along the first axis (e.g., the vertical axis) are connected to the inner interconnections in the directions opposite to each other, thereby reducing the section in which the inner interconnection of the first electrode and the second electrode are disposed in parallel to each other. As a result, the interference between the inner interconnection of the first electrode and the second electrode can be reduced.

While the inventive concepts have been described with reference to example embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. A touch panel comprising:
  a touch detecting region in which a plurality of sensing regions are two-dimensionally arranged on a single substrate;
  a plurality of first electrodes formed in shapes of predetermined patterns in the plurality of sensing regions, respectively, the plurality of first electrodes sensing a position of a vertical axis of touch applied to the touch detecting region;
  a plurality of second electrodes electrically insulated from the first electrodes in the plurality of sensing regions, respectively, the plurality of second electrodes surrounding the first electrodes along the predetermined patterns, the plurality of second electrodes extending in a direction of the vertical axis, and the plurality of second electrodes sensing a position of a horizontal axis of the touch;
  an outer interconnection region provided at a side of the touch detecting region; and
  a plurality of inner interconnections electrically connected to the plurality of first electrodes, respectively, the plurality of inner interconnections extending along the vertical axis to the outer interconnection region,
  wherein patterns of the first electrodes adjacent to each other along the vertical axis form a blur section in which the patterns share a position of at least a portion of the vertical axis while being spaced apart from each other along the horizontal axis,
  wherein the inner interconnections are disposed in such a way that a distance between the inner interconnections increases as the number of the inner interconnections disposed between the first electrodes adjacent to each other along the horizontal axis decreases.

2. The touch panel of claim 1, wherein the predetermined pattern includes a plurality of assistant electrodes,
  wherein the plurality of assistant electrodes are spaced apart from each other along the horizontal axis,
  wherein the plurality of assistant electrodes are disposed at different positions on the vertical axis, and
  wherein the plurality of assistant electrodes are electrically connected to each other.

3. The touch panel of claim 2, wherein the blur section is formed by a first assistant electrode of the plurality of assistant electrodes included in one first electrode and a second assistant electrode of the plurality of assistant electrodes included in another first electrode adjacent to the one first electrode along the vertical axis, and
  wherein the first assistant electrode and the second assistant electrode share the position of the at least a portion of the vertical axis while being spaced apart from each other along the horizontal axis.

4. The touch panel of claim 1, wherein the predetermined pattern includes two bars that are spaced apart from each other along the horizontal axis and have predetermined lengths, and
  wherein the two bars are disposed at different positions on the vertical axis and are electrically connected to each other.

5. The touch panel of claim 4, wherein the blur section is formed by a first bar of the two bars included in one first electrode and a second bar of the two bars included in another first electrode adjacent to the one first electrode along the vertical axis, and
  wherein the first bar and the second bar share the position of the at least a portion of the vertical axis while being spaced apart from each other along the horizontal axis.

6. A touch panel comprising:
  a touch detecting region in which a plurality of sensing regions are two-dimensionally arranged on a single substrate;
  a plurality of first electrodes formed in shapes of predetermined patterns in the plurality of sensing regions, respectively, the plurality of first electrodes sensing a position of a vertical axis of touch applied to the touch detecting region;
  a plurality of second electrodes electrically insulated from the first electrodes in the plurality of sensing regions, respectively, the plurality of second electrodes surrounding the first electrodes along the predetermined patterns, the plurality of second electrodes extending in a direction of the vertical axis, and the plurality of second electrodes sensing a position of a horizontal axis of the touch;
  an outer interconnection region provided at a side of the touch detecting region; and
  a plurality of inner interconnections electrically connected to the plurality of first electrodes, respectively, the plurality of inner interconnections extending along the vertical axis to the outer interconnection region, wherein a distance between the inner interconnections disposed between the first electrodes adjacent to each other along the horizontal axis is determined to divide a space between the first electrodes adjacent to each other along the horizontal axis into equal parts.

7. A touch panel comprising:

a touch detecting region in which a plurality of sensing regions are two-dimensionally arranged on a single substrate;

a plurality of first electrodes formed in shapes of predetermined patterns in the plurality of sensing regions, respectively, the plurality of first electrodes sensing a position of a vertical axis of touch applied to the touch detecting region;

a plurality of second electrodes electrically insulated from the first electrodes in the plurality of sensing regions, respectively, the plurality of second electrodes surrounding the first electrodes along the predetermined patterns, the plurality of second electrodes extending in a direction of the vertical axis, and the plurality of second electrodes sensing a position of a horizontal axis of the touch and an outer interconnection region provided at a side of the touch detecting region, wherein arrangement directions of the predetermined patterns of the first electrodes adjacent to each other along the vertical axis are different from each other in such a way that connection directions of the adjacent first electrodes with respect to inner interconnections are opposite to each other, wherein inner interconnections electrically connected to the plurality of first electrodes extend along the vertical axis to the outer interconnection region, wherein the inner interconnections are disposed in such a way that a distance between the inner interconnections increases as the number of the inner interconnections disposed between the first electrodes adjacent to each other along the horizontal axis decreases.

8. The touch panel of claim 7, wherein patterns of the first electrodes adjacent to each other along the vertical axis form a blur section in which the patterns share a position of at least a portion of the vertical axis while being spaced apart from each other along the horizontal axis.

9. The touch panel of claim 8, wherein the predetermined pattern includes a plurality of assistant electrodes, wherein the plurality of assistant electrodes are spaced apart from each other along the horizontal axis, wherein the plurality of assistant electrodes are disposed at different positions on the vertical axis, and wherein the plurality of assistant electrodes are electrically connected to each other.

10. The touch panel of claim 9, wherein the blur section is formed by a first assistant electrode of the plurality of assistant electrodes included in one first electrode and a second assistant electrode of the plurality of assistant electrodes included in another first electrode adjacent to the one first electrode along the vertical axis, and wherein the first assistant electrode and the second assistant electrode share the position of the at least a portion of the vertical axis while being spaced apart from each other along the horizontal axis.

11. A touch panel comprising:

a touch detecting region in which a plurality of sensing regions are two-dimensionally arranged on a single substrate;

a plurality of first electrodes formed in shapes of predetermined patterns in the plurality of sensing regions, respectively, the plurality of first electrodes sensing a position of a vertical axis of touch applied to the touch detecting region;

a plurality of second electrodes electrically insulated from the first electrodes in the plurality of sensing regions, respectively, the plurality of second electrodes surrounding the first electrodes along the predetermined patterns, the plurality of second electrodes extending in a direction of the vertical axis, and the plurality of second electrodes sensing a position of a horizontal axis of the touch; and an outer interconnection region provided at a side of the touch detecting region, wherein arrangement directions of the predetermined patterns of the first electrodes adjacent to each other along the vertical axis are different from each other in such a way that connection directions of the adjacent first electrodes with respect to inner interconnections are opposite to each other, wherein inner interconnections electrically connected to the plurality of first electrodes extend along the vertical axis to the outer interconnection region, wherein a distance between the inner interconnections disposed between the first electrodes adjacent to each other along the horizontal axis is determined to divide a space between the first electrodes adjacent to each other along the horizontal axis into equal parts.

* * * * *